April 4, 1967     H. E. SHEFFER     3,312,573
NON-LINEAR OVERCOAT FOR COATED ELECTRICAL CONDUCTOR
Filed May 6, 1963
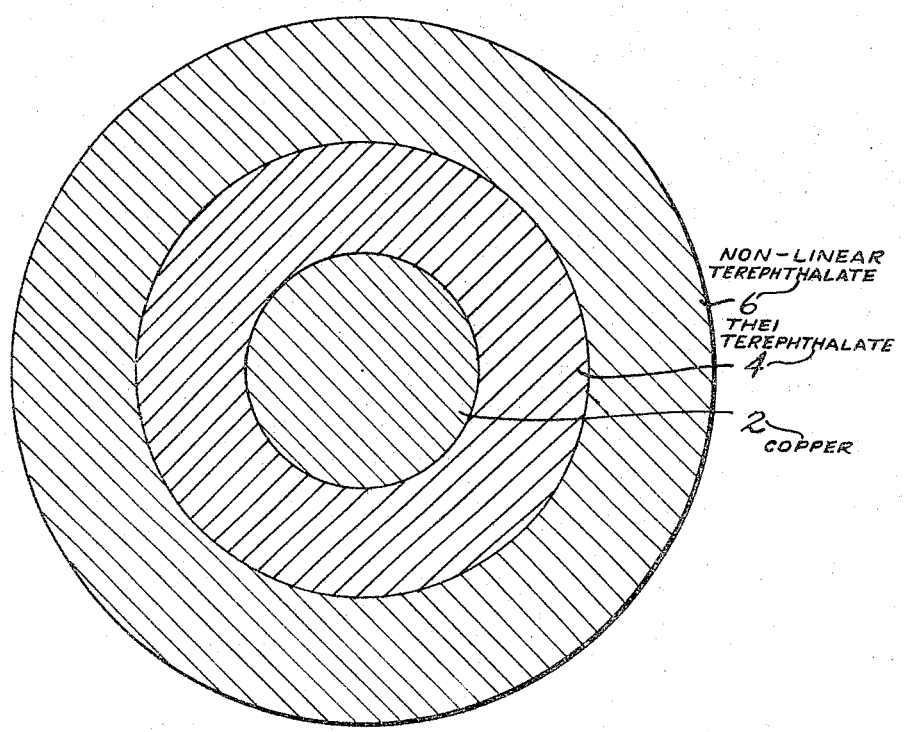
INVENTOR.
HOWARD E. SHEFFER
BY
Cushman, Darby & Cushman
ATTORNEYS United States Patent Office 3,312,573
Patented Apr. 4, 1967

3,312,573
NON-LINEAR OVERCOAT FOR COATED
ELECTRICAL CONDUCTOR
Howard E. Sheffer, Burnt Hills, N.Y., assignor to Schenectady Chemicals, Inc., Schenectady, N.Y., a corporation of New York
Filed May 6, 1963, Ser. No. 278,070
12 Claims. (Cl. 117—218)

This invention relates to insulated electrical conductors and more particularly to such a conductor, e.g., a magnet wire, having improved insulation of the varnish or enamel type, and to a method of making the same.

It has recently been proposed, Koerner Patent 3,022,200, to provide an electrical conductor with a thin, uniform and continuous inner dielectric layer of a non-linear, thermosetting polyester, curing the polyester on the conductor and then providing an overcoat of certain specific linear polymers, preferably polyethylene terephthalate.

It is an object of the present invention to prepare insulated electrical conductors having a non-linear, thermosetting resin undercoat and a non-linear, branched resin overcoat which is equal to, and in regard to some properties, superior to the Koerner product having a linear overcoat.

Another object is to develop an overcoat which can be applied in larger amounts per pass than is possible with Dacron, the preferred material of Koerner.

A further object is to reduce the number of overcoat layers required to eliminate heat shock and solvent shock without detracting from the desirable properties of the insulation.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by applying to an electrical conductor the known thermosetting resin undercoats and applying as an overcoat a non-linear, branched polyester based on terephthalic acid or isophthalic acid as the acid component and as the alcohol component 90–75 equivalent percent of a dihydric alcohol and 10–25 equivalent percent of tris (2-hydroxyethyl) isocyanurate. In tris (2-hydroxyethyl) isocyanurate the three hydroxyethyl groups are attached to the three nitrogen atoms of the ring.

While there can be employed any of the conventional non-linear, thermosetting resins for the undercoat, the preferred undercoat will be described hereinafter.

Thus, the undercoat can be an oleoresin, e.g., an oil modified phenol-formaldehyde resin, or an epoxy resin, e.g., a bisphenol A-epichlorhydrin resin, or a non-linear, thermosetting polyester of the following types:

(1) an ester of terephthalic or isophthalic acid with glycerine, pentaerythritol, sorbitol, 1,2,6-hexanetriol, trimethylolethane, trimethylolpropane or other polyhydric alcohol containing 3 or more hydroxyl groups, plus small quantities of silanes, or (2) esters of terephthalic or isophthalic acid with a mixture of (a) a polyhydric alcohol containing 3 or more hydroxyl groups such as glycerine, pentaerythritol, 1,2,6-hexanetriol, sorbitol, trimethylolpropane, trimethylolethane or mixtures thereof, and (b) an aliphatic hydrocarbon diol such as ethylene glycol, butanediol-1,4, neopentyl glycol, pentanediol-1,5, butene-2-diol-1,4. Such polyesters normally contain 25–62 equivalent percent of the acid, 13–46 equivalent percent of the alcohol containing at least 3 hydroxyl groups and 13–46 equavalent percent of the aliphatic hydrocarbon diol.

The polyesters can be further modified by reacting with a polyisocyanate (including blocked isocyanates) to form polyurethanes.

Examples of polyesters of the above-mentioned types are disclosed in Kohl Patent 2,686,739, Goodwin Patent 2,686,740, Sheffer Patent 2,889,304, Precopio Patent 2,936,296, Sheffer Patent 2,982,754 and the Koerner patent.

Examples of polyisocyanate modifying agents are set forth in the Koerner patent and Sheffer Patent 2,982,754. Further examples will be set forth below.

As previously indicated, the preferred undercoat is the ester of terephthalic acid or isophthalic acid with a polyhydric alcohol in which at least 50 equivalent percent of the total polyhydric alcohol is tris (2-hydroxyethyl) isocyanurate. While the tris (2-hydroxyethyl) isocyanurate can be the sole polyhydric alcohol, it can be replaced in part by another polyhydric alcohol, e.g., ethylene glycol; glycerine; pentaerythritol; 1,1,1-trimethylolethane; 1,1,1-trimethylolpropane; sorbitol; mannitol; alpha, omega aliphatic hydrocarbon diols having 4 to 5 carbon atoms, e.g., butanediol-1,4; pentanediol-1,5; butene-2-diol-1,4; butyne-2-diol-1,4; and neopentyl glycol, or by cyclic glycols, e.g., 2,2,4,4-tetramethyl-1,3-cyclobutanediol, 1,4-cyclohexanedimethanol and the like. The preferred modifying alcohols are glycols.

In making the polyester usually 15–46 equivalent percent is the carboxylic acid reactant and the balance is the polyhydric alcohol; there should be an excess of alcoholic groups over acid groups.

All of the polycarboxylic acid constituent can be the terephthalic acid or isophthalic acid or mixtures thereof or there can be employed modifying acids such as hemimellitic acid, adipic acid, trimesic acid, sebacic acid, trimellitic acid, ortho phthalic acid, hexachloroendomethylene tetrahydrophthalic acid, tetrachlorophthalic acid, maleic acid and succinic acid in an amount up to 50 equivalent percent of the total acid component.

Esterification is accomplished by heating tris (2-hydroxyethyl) isocyanurate (or mixtures thereof with another polyhydric alcohol) with the acid reactant such as terephthalic acid or isophthalic acid or acyl halides thereof, e.g., terephthaloyl dichloride, or a lower alkyl ester thereof, e.g., methyl, ethyl, propyl, butyl, amyl, hexyl and octyl terephthalates and the corresponding isophthalates, as well as the half esters, e.g., monomethyl terephthalate. Preferably, dimethyl terephthalate is employed.

The total number of hydroxyl groups on the polyhydric alcohols normally is 1 to 1.6 times the total number of carboxyl groups on the acids.

Small amounts of metal driers are also employed in conventional fashion.

It has also been found desirable in some instances to improve the properties of the polyester by the addition of a polyisocyanate in an amount of 10 to 40%, preferably 15 to 25% by weight of the total of the polyisocyanate and polyester. Preferably, the polyisocyanate has at least three available isocyanate groups.

Among the polyisocyanates which can be employed there may be mentioned diisocyanates such as 2,4-tolylene diisocyanate, 2,6-tolylene diisocyanates, cyclopentylene diisocyanate, m-phenylene diisocyanate, p-phenylene diisocyanate, ethylene diisocyanate, butylidene diisocyanate, 1,5-naphthalene diisocyanate, 1,6-hexamethylene diisocyanate, dianisidine diisocyanate, 4,4'-diphenyl ether diisocyanate, 4,4',4''-triphenyl methane triisocyanate (Desmodur R), the cyclic trimer of 2,4-tolylene diisocyanate, the cyclic trimer of 2,6-tolylene diisocyanate, mixtures of the cyclic trimers of 2,4-tolylene diisocyanate and 2,6-tolylene diisocyanate, the trimer of 4,4'-diphenyl methane diisocyanate, trifunctional isocyanate trimers having the formula:

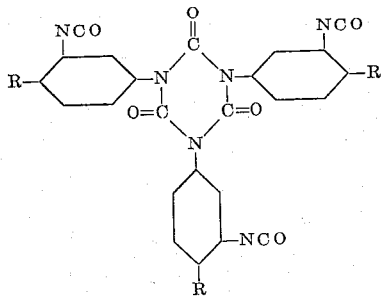

where R is a lower alkyl radical, e.g., n-butyl tertiary butyl, secondary butyl, isopropyl, methyl, ethyl, etc., 1,3,5-triisocyanato benzene, 2,4,6-triisocyanato toluene, 4,4'-dimethyl-diphenylmethane, 2,2',5,5'-tetraisocyanate, 2,4,4'-triisocyanato diphenylmethane, 2,4,6-triisocyanato diphenyl ether, 2,2',4-triisocyanato diphenyl ether, 2,2',4-triisocyanato diphenyl sulfide, 2,4,4'-triisocyanato diphenyl sulfide 2,3',4-triisocyanato-4'-methyl diphenyl ether, 2,3',4-triisocyanato-4'-methoxydiphenyl ether, 2,4,4'-triisocyanato-3'-chlorodiphenyl ether, 2,4,4'-triisocyanato-3',5'-dimethyl diphenyl ether, 4,4',6-diphenyl triisocyanate, 1,2,4-butanetriol triisocyanate 1,3,3-pentane triisocyanate, 1,2,2-butane triisocyanate, phloroglucinol triisocyanate, the reaction product of 3 mols of 2,4-tolylene diisocyanate with 1 mol of trimethylol propane, the reaction product of 3 mols of 2,6-tolylene diisocyanate with 1 mol of trimethylol propane, the reaction product of 3 mols of 2,4-tolylene diisocyanate with 1 mol of trimethylol propane, the reaction product of 3 mols of 2,4-tolylene diisocyanate with 1 mol of trimethylol ethane and, in general, the reaction product of a diisocyanate with sufficient polyhydric alcohol to react with half the isocyanate groups.

While the polyisocyanates can be used as such, particularly where pot life is not important, it is preferred to block the isocyanate groupings with a group that will split off at the reaction temperature employed with the polymeric terephthalic or isophthalic ester. Typical compounds which can be used to block the isocyanate groupings, e.g., by forming carbamates therewith, are monohydric phenols, such as phenol, meta-cresol, para-cresol, ortho-cresol and mixtures thereof, the xylenols, e.g., 2,6-dimethyl phenol, 4-ethyl phenol, 4-tertiary butyl phenol, 2-butyl phenol, 4-n-octyl phenol, 4-isooctyl phenol, 2-chloro phenol, 2,6-dichloro phenol, 2-nitro-phenol, 4-nitro phenol, 3-nitro phenol, monohydric alcohols such as methyl alcohol, ethyl alcohol, n-propyl alcohol, isopropyl alcohol, tertiary butyl alcohol, tertiary amyl alcohol, octyl alcohol, stearyl alcohol, acetoacetic ester, hydroxyalkyl-carbamic acid aryl esters, e.g., hydroxyethylcarbamic acid phenyl ester, hydroxyethylcarbamic acid cresyl ester, diethyl malonate, mercaptans, e.g., 2-mercaptobenzothiazole, 2-mercaptothiazoline, dodecyl mercaptan, ethyl 2-mercaptothiazole, p-naphthyl mercaptan, α-naphthyl mercaptan, methyl mercaptan, butyl mercaptan, lactams, e.g., ε-caprolactam, Δ-valerolactam, γ-butyrolactam, β-propiolactam, imides, e.g., succinimide, phthalimide, naphthalimide, glutarimide, dimethylphenyl varbinol, secondary amines, e.g., o-ditolyamine, m-ditolylamine, p-ditolylamine, N-phenyl toluidine, phenyl-α-naphthalyamine, carbazole, diphenylamine, etc., mono-α-phenylethyl phenol, di-α-phenylethyl phenol, tri-α-phenylethyl phenol, carvacrol, thymol, methyl diphenyl carbinol, triphenyl carbinol, 1-nitro tertiary butyl carbinol, 1-chloro-tertiary butyl carbinol, triphenyl silanol, 2,2'-dinitrodiphenyl-amine, 2,2'-dichlorodiphenylamine, ethyl n-butyl malonate, ethyl benzyl malonate, acetyl acetone, acetonyl acetone, benzimidazole, 1-phenyl-3-methyl-5-pyrazolone.

As specific examples of such blocked polyisocyanates, there may be mentioned Mondur S, wherein the isocyanate groups of the reaction product of 3 mols of mixed, 2,4- and 2,6-tolylene diisocyanate with trimethylol propane are blocked by esterification with m-cresol. At present, Mondur SH is the preferred polyisocyanate.

Other blocked polyisocyanates include the cyclic trimer of 2,4-tolylene diisocyanate having the isocyanate groups blocked with tertiary butyl alcohol or tertiary amyl alcohol or dimethyl ethinyl carbinol or aceto-acetic acid ester or phenol or cresylic acid or ε-caprolactam or 2-mercapto-benzothiazole or succinimide or phthalimide or diphenyl amine or phenyl-β-naphthyl amine, triphenyl methane triisocyanate having the isocyanate groups blocked with phenol or mixed cresols or tertiary butyl alcohol or phthalimide, 1,3,3-pentanetriisocyanate having the isocyanate groups blocked with m-cresol, etc.

Unless otherwise stated hereinafter in the specification and claims, it is understood that whenever the term "polyisocyanate" is employed, it is intended to include both the free isocyanates and the blocked isocyanates.

The polyisocyanate is mixed with the preformed polyester either dry or dissolved in a solvent prior to mixing. The reaction between the polyester and the polyisocyanate is hastened by using elevated temperatures and in preparing wire enamels they are usually reacted at a temperature of about 650 to 800° F.

The metal drier is preferably used in an amount of 0.2 to 1.0% metal based on the total solids in the enamel. Typical metal driers include the zinc, lead, calcium or cadmium linoleates, octoates, and resinates of each of these metals, e.g., zinc resinate, cadmium resinate, lead linoleate, calcium linoleate, zinc naphthenate, lead naphthenate, calcium naphthenate, cadmium naphthenate, zinc octoate and cadmium octoate. Other suitable metal driers, specifically polyvalent metal driers such as manganese naphthenate and cobalt naphthenate can be employed.

It has further been found that the properties of the polyester wire enamel can be improved by incorporating a tetra alkyl titanate in place of the metal drier and polyisocyanate. Typical tetra alkyl titanates are tetraisopropyl titanate, tetrabutyl titanate, tetrahexyl titanate, tetramethyl titanate and tetrapropyl titanate. The titanate is used in small amounts, e.g., 0.001 to 4.0% titanium metal on the total solids of the enamel.

The solvent employed for the thermosetting polyester undercoat in making the wire enamel can be cresylic acid, which has a boiling range of 185 to 230° C., or it can be the individual cresols, e.g., p-cresol, m-cresol or o-cresol.

It is frequently desirable to dilute the cresylic acid with an aromatic hydrocarbon, e.g., a heavy coal tar or petroleum naphtha or with xylene. The naphtha can be 0 to 60%, e.g., 5 to 60% based on the total weight of the solvents. Suitable commercial aromatic naphthas are EW naphtha (an enamel wire heavy coal tar naphtha) and Solvesso No. 100, an aromatic naphtha derived from petroleum.

The temperature of reaction is not especially critical, and temperatures conventionally employed in preparing glycerine and/or ethylene glycol esters of terephthalic acid can be used, e.g., 80° C. to reflux temperature.

The wire enamel is applied to the wire, e.g., copper wire, by either the "free dip" or the die application procedure. In the following specific examples the die application procedure was employed to obtain a build-up of approximately 3 mils on #18 A.W.G. copper wire.

As previously stated, the present invention employs a novel overcoat which is a non-linear, branched polyester based on terephthalic acid or isophthalic acid as the acid component and as the alcohol component 90–75 equivalent percent of a dihydric alcohol and 10–25 equivalent percent of tris (2-hydroxyethyl) isocyanurate. As the dihydric alcohol there can be used one or more of those previously set forth, e.g., ethylene glycol, butanediol-1,4, neopentyl glycol and pentanediol-1,5. In making the polyester there are normally 1 to 1.6 hydroxyl groups available for each carboxyl group of the terephthalic acid Various modifying agents can be employed in the overcoat. Thus, any of the previously mentioned titanates can be used to provide 0.001 to 4.0% titanium metal on the total solids of the enamel. Also, there can be used in the overcoat any of the polyisocyanates previously set forth. The amount of organic polyisocyanate, when employed, can be 5 to 40% of the total of polyisocyanate and polyester.

It is possible to replace a portion of the non-linear, branched polyester by up to 40%, e.g., 5 to 40% of Dacron (polyethylene terephthalate).

The new overcoat containing 10–25 equivalent percent of tris (2-hydroxyethyl) isocyanurate based on the total alcohol is not soluble in cresylic acid. However, it is soluble in a solvent which is a mixture of a chlorophenol and a cresol and preferably also including phenol per se.

As the chlorophenol there can be used o-chlorophenol, m-chlorophenol and p-chlorophenol; an alkylated chlorophenol, such as p-chloro-m-cresol (3-methyl-4-chlorophenol), 2-sec. butyl-4-chlorophenol and p-chlorothymol. Mixtures of such chlorophenols can be used.

As the cresol there can be used o-cresol, m-cresol, p-cresol, cresylic acid or a mixture of m-cresol and p-cresol.

The preferred solvent composition contains p-chlorophenol, o-cresol and phenol. Another preferred mix contains p-chlorophenol and cresylic acid.

The solvent preferably contains 30 to 50% of the chlorophenol, 25 to 50% of phenol and 10 to 35% of cresol by weight. If, as stated previously, a cresol is substituted for the phenol, the total cresol can be employed in an amount up to 70% by weight.

One of the advantages of the present invention is that the polyester of terephthalic acid and a mixture of a glycol and tris (2-hydroxyethyl) isocyanurate in which the latter component is 10 to 25% of the total alcohol forms stable solutions in the chlorophenol-cresol-phenol solvent containing 30% solids by weight. Dacron normally forms stable solutions only up to 15% by weight. Consequently, utilizing the non-linear, branched polyester of the present invention it is possible to get more overcoat per pass and less solvent is passed off into the atmosphere or is required to be recovered.

By utilizing the isocyanurate-containing polyester product of the present invention as the overcoat it has been found that the coated wire has good heat resistance at 240° C. as well as good heat shock at 175° C. after 13.5% stretch. The purpose of applying the overcoat in wire enamel practice is to attain improved results in this heat shock test over the heat shock properties when employing only the undercoat.

Unless otherwise indicated, all parts and percentages are by weight.

In the examples wherein an undercoat alone or an undercoat plus an overcoat was applied to a wire, the total build on the wire was 3 mils.

The coats were applied to the wire in conventional manner by die application procedure. The coated wire was passed through a commercial wire enamel tower at a wire speed of about 25 ft./min. and at a temperature of 750° F.

The single figure of the drawing is a cross-sectional view of an insulated magnet wire comprising a conductor 2 of #18 A.W.G. copper wire, an inner layer 4 made up of multiple coatings, e.g., 4 coatings of a thermosetting polyester, specifically, the polyester made from 1044 parts of tris (2-hydroxyethyl) isocyanurate and 776 parts of dimethyl terephthalate and an outer layer 6 formed of 2 coatings of a non-linear, branched polyester made from 4 mols dimethyl terephthalate, 3.48 mols ethylene glycol and 0.498 mol tris (2-hydroxyethyl) isocyanurate. The inner layer 4 and the outer layer 6 are, for example, 2 mils and 1 mil thick, respectively.

Illustrative undercoat compositions are set forth in Examples 1 to 4.

EXAMPLE 1

A thermosetting polyester was made from a mixture of 4400 parts of tris (2-hydroxyethyl) isocyanurate (50.7 equivalent), 481 parts of ethylene glycol (15.4 equivalent) and 5019 parts of dimethyl terephthalate (51.8 equivalent). The reacants were cooked at 420 to 450° F. together with 4.5 parts of litharge (catalyst) and 2173 parts of xylene (solvent). After the cooking was completed (about 8 hours) there was added a total of 9775 parts of cresylic acid and 5265 parts of Solvesso 100 to give a wire enamel containing about 35% solids. This product was useful as a wire enamel undercoat.

EXAMPLE 2

To 8687 parts of the 35% solids solution of polymeric tris (2-hydroxyethyl) isocyanurate-ethylene glycol-terephthalate prepared in Example 1 there were added 4375 parts of cresylic acid, 275 parts of Solvesso 100, 568 parts of Mondur SH, 284 parts of melamine-formaldehyde resin (Resimene 882–60), 57.25 parts of tetra isopropyl titanate, 735 parts of Amsco 140 (an aromatic hydrocarbon solvent) and 23.75 parts of an 18% solution of zinc octoate in EW naphtha.

This product contained about 30% solids and was useful as a wire enamel undercoat.

EXAMPLE 3

A thermosetting polyester was prepared from a mixture of 930 parts ethylene glycol, 810 parts of 96% glycerine, 257 parts of butanediol-1 and 4660 parts of dimethyl terephthalate. The reactants were cooked to a hydroxyl value of 135 at 420 to 450° F. together with 2.1 parts of litharge, 900 parts of Solvesso 100, 300 parts of xylene and then 7000 parts of cresylic acid were added to provide a wire enamel undercoat solution containing 42% solids.

EXAMPLE 4

To 1044 grams (4 mols) of tris (2-hydroxyethyl) isocyanurate were added 776 grams (4 mols) of dimethyl terephthalate, 100 ml. of xylol, 200 ml. Solvesso 100 and 3.6 grams tetra isopropyl titanate and the mixture cooked for 6 hours until a temperature of 365° F. was reached. Then cresylic acid was added to reduce the solids content to 73.9%.

To 1000 grams of this product were added 848 grams of cresylic acid, 615 grams of Solvesso 100 and 29.5 grams of tetra isopropyl titanate to give a wire enamel suitable for use as an undercoat and having a solids content of 30% and a viscosity of H=I (Gardner-Holdt scale).

Preparation of overcoat formulations and their use is disclosed in the following example.

EXAMPLE 5

776 grams of dimethyl terephthalate, 216 grams of ethylene glycol, 130 grams of tris (2-hydroxyethyl) isocyanurate, 100 cc. of Solvesso 100, 100 cc. of xylene and 0.6 gram litharge (catalyst) were heated at 420 to 450° F. until a viscosity of Z5–Z6 at 40% solids in a mixture of 40 parts p-chlorophenol, 40 parts phenol and 20 parts o-cresol hereinafter called Solvent A. The solution was then reduced to 34% solids using 1300 grams total of Solvent A.

EXAMPLE 6

500 parts of the non-linear, branched polyester solution in Solvent A (34% solids) prepared in Example 5 was diluted with 67 parts of Solvent A, 6.8 parts of tetra propyl titanate, 17 parts Mondur SH and 25.5 parts of cresylic acid. The above material was applied as an overcoat on 18 gauge copper wire over the polyester wire enamel prepared in Example 1 and used as an undercoat. Four layers of the undercoat and 2 layers of the overcoat were provided to give a total build-up of 3 mils of enamel on the wire.

EXAMPLE 7

776 grams of dimethyl terephthalate, 216 grams of ethylene glycol, 130 grams of tris (2-hydroxyethyl) isocyanurate, 100 cc. of Solvesso 100, 100 cc. of xylene and 0.6 gram of litharge were heated at 420 to 440° F. until a viscosity of Z6+ at 40% solids in Solvent A was obtained. The solution was then reduced to 24% solids using 2100 grams total of Solvent A.

EXAMPLE 8

The non-linear, branched polyester prepared in Example 7 was formulated into a wire enamel overcoat by adding to 500 parts thereof 5.8 parts tetra propyl titanate, 14.5 parts Mondur SH and 21.5 parts of cresylic acid. The above material was applied as an overcoat on 18 gauge copper wire over the polyester wire enamel prepared in Example 1 and used as an undercoat. There were provided 4 layers of undercoat and 2 layers of overcoat to give a total build-up of 3 mils of enamel on the wire.

EXAMPLE 9

To 210.5 parts of the non-linear, branched polyester wire enamel composition prepared in Example 7 and containing 34% solids there was added 2.5 parts of tetra isopropyl titanate. This composition is designated Part I.

Separately, 32 parts of polyethylene terephthalate (Dacron) were dissolved in 181 parts of Solvent A at 250° F. This composition is designated Part II.

Part I and Part II were mixed at room temperature. The mixture was then applied as an overcoat on 18 gauge copper wire over the polyester wire enamel prepared in Example 1 and used as an undercoat. There were provided 5 layers of undercoat and 1 layer of overcoat to give a total build-up of 3 mils of enamel on the wire.

The formulation of Example 9 is presently preferred because it gives a better looking wire enamel and only requires 1 layer of overcoat.

The heat shock at 175° C. after 13.5% stretch and the AIEE No. 57 Heat Life, hours to 1000 volt breakdown are shown in the following table:

|  | Mandrel | No Overcoat Polyester of Ex. 1 Alone | Overcoat Ex. 9 | Overcoat Ex. 8 | Overcoat Ex. 6 |
| --- | --- | --- | --- | --- | --- |
| Heat Shock at 175° C. (13.5% Stretch). | 1x | 0% Pass | 50% Pass | 70% Pass | 90% Pass. |
|  | 2x | 0% Pass | 80% Pass | 100% Pass | 90% Pass. |
|  | 3x | 60% Pass | 90% Pass | 100% Pass | 100% Pass. |
|  | 4x | 70% Pass | 100% Pass | 100% Pass | 100% Pass. |
| AIEE No. 57 Heat Life, hrs. to 1,000 volt breakdown | 250° C | 1,044 | 1,255+ | 895+ | 1,188+. |
|  | 260° C | 415 | 653 |  | 750. |

In the table, the + indicates there was no failure at the termination of the test.

A comparison of the results in the above table with the results in columns 7–8 of the Koerner patent shows that the product of the present invention has superior heat shock and AIEE 57 properties to those of the product of Koerner.

In place of the polyester of Example 1, which was used as an undercoat in Examples 6, 8 and 9, there can be used the polyesters of Examples 2, 3 and 4, or any of the other thermosetting resins previously set forth. It is preferred, however, to use as the undercoat a terephthalic acid ester of one or more polyhydric alcohols in which at least 50 equivalent percent is tris (2-hydroxyethyl) isocyanurate.

I claim:

1. An electrical conductor provided with a continuous inner dielectric coating of a non-linear thermosetting resin and a thin, uniform, continuous, outer dielectric coating of a non-linear, branched polyester of an acid of the group consisting of terephthalic acid and isophthalic acid with a mixture of tris (2-hydroxyethyl) isocyanurate and a dihydric alcohol, the isocyanurate being 10–25 equivalent percent of the total alcohol component.

2. An electrical conductor according to claim 1 wherein the inner coating is a non-linear thermosetting polyester cured on the wire.

3. An electrical conductor according to claim 2 wherein the dihydric alcohol is an alkanediol having 2–5 carbon atoms and the acid is terephthalic acid.

4. An electrical conductor provided with a non-linear first continuous coating comprising a polymeric ester of a polycarboxylic acid of the group consisting of terephthalic acid and isophthalic acid with a polyhydric alcohol, at least 50 equivalent percent of which is tris (2-hydroxyethyl) isocyanurate and an outer continuous coating of a non-linear, branched polyester of a polycarboxylic acid selected from the group consisting of terephthalic acid and isophthalic acid with a mixture of tris (2-hydroxyethyl) isocyanurate and a dihydric alcohol, the isocyanurate being 10–25 equivalent percent of the total alcohol component.

5. An electrical conductor according to claim 4 wherein the polycarboxylic acid in each instance is terephthalic acid.

6. An electrical conductor according to claim 5 wherein the dihydric alcohol is an alkanediol having 2 to 5 carbon atoms.

7. An electrical conductor according to claim 6 wherein the outer coat includes 5 to 40% of a linear polyethylene terephthalate in addition to the non-linear, branched polyester.

8. An electrical conductor according to claim 6 wherein the outer coating consists of the non-linear, branched polyester.

9. An electrical conductor according to claim 6 wherein the non-linear, branched polyester is modified by an isocyanate to form a polyurethane.

10. A method of applying an overcoat of a non-linear, branched polyester of an acid selected from the group consisting of terephthalic acid and isophthalic acid with a mixture of tris (2-hydroxyethyl) isocyanurate and a dihydric alcohol, the isocyanurate being 10–25 equivalent percent of the total alcohol component, to an electrical conductor having an undercoat of a cured non-linear thermosetting polyester comprising dissolving the non-linear, branched polyester in a solvent which is a mixture of 30 to 50% chlorophenol with 70 to 50% of at least one member of the group consisting of phenol and cresol, to form a solution containing at least 25% solids and then applying said solution to said undercoated conductor and heating to remove said solvent.

11. A process according to claim 10 wherein the acid is terephthalic acid, the dihydric alcohol is an alkanediol having 2 to 5 carbon atoms and said solvent is a mixture of 30 to 50% chlorophenol, 25 to 50% phenol and 10 to 35% cresol.

12. An electrical conductor provided with a continuous undercoat of a non-linear, thermosetting polymeric ester of terephthalic acid with a mixture of polyhydric alcohols, at least 50 equivalent percent of which is tris (2-hydroxyethyl) isocyanurate and the balance is ethylene glycol and a continuous overcoat of a non-linear, branched polymeric ester of terephthalic acid with a mixture of 10–25 equivalent percent of tris (2-hydroxyethyl) isocyanurate and 90–75 equivalent percent of ethylene glycol.

References Cited by the Examiner
UNITED STATES PATENTS

| | | | |
|---|---|---|---|
| 3,201,276 | 8/1965 | Meyer et al. | 117—218 |
| 3,240,626 | 3/1966 | Olson et al. | 117—218 |

ALFRED L. LEAVITT, *Primary Examiner.*

WILLIAM L. JARVIS, *Examiner.*